US007884885B2

(12) United States Patent
Su et al.

(10) Patent No.: US 7,884,885 B2
(45) Date of Patent: Feb. 8, 2011

(54) POWER CONTROL METHOD USED WITH TV MODULE OF PORTABLE ELECTRONIC APPARATUS

(75) Inventors: Hung-Shen Su, Taipei (TW);
Jui-Hsiang Yang, Taipei (TW);
Jiun-Kuei Jung, Taipei (TW)

(73) Assignee: Avermedia Technologies, Inc., Taipei Hsien (TW)

( * ) Notice: Subject to any disclaimer, the term of this patent is extended or adjusted under 35 U.S.C. 154(b) by 1203 days.

(21) Appl. No.: 11/466,935

(22) Filed: Aug. 24, 2006

(65) Prior Publication Data
US 2007/0159558 A1 Jul. 12, 2007

(30) Foreign Application Priority Data
Jan. 11, 2006 (TW) ............... 95101077 A

(51) Int. Cl.
H04N 5/63 (2006.01)
H04N 5/64 (2006.01)

(52) U.S. Cl. ..................... 348/730; 348/838

(58) Field of Classification Search ......... 348/730, 348/837–839, 552, 790, 794; 715/718, 864; 345/211, 212; 455/556.1, 556.2, 343.1–343.3, 455/344–346; 361/679.55, 679.56; 386/46, 386/68, 82, 93, 124–126
See application file for complete search history.

(56) References Cited

U.S. PATENT DOCUMENTS

| 5,701,599 | A * | 12/1997 | Aihara ................... 455/186.1 |
| 5,760,848 | A * | 6/1998 | Cho ........................ 348/839 |
| 6,314,522 | B1 * | 11/2001 | Chu et al. ................. 713/322 |
| 6,601,180 | B1 | 7/2003 | Paredes |
| 6,650,376 | B1 | 11/2003 | Obitsu |
| 6,675,303 | B1 | 1/2004 | Lam |
| 6,760,850 | B1 * | 7/2004 | Atkinson et al. ............ 713/320 |
| 6,792,577 | B1 * | 9/2004 | Kimoto ..................... 715/235 |
| 7,106,382 | B2 * | 9/2006 | Shiotsu .................... 348/555 |
| 7,317,495 | B2 * | 1/2008 | Takahashi .................. 348/838 |
| 2002/0036624 | A1 * | 3/2002 | Ohta et al. ................. 345/204 |
| 2003/0193472 | A1 * | 10/2003 | Powell ..................... 345/102 |
| 2004/0252246 | A1 | 12/2004 | Lee |
| 2005/0046390 | A1 * | 3/2005 | Kimura .................... 320/132 |
| 2005/0048960 | A1 * | 3/2005 | Yamauchi et al. ........... 455/418 |
| 2005/0213929 | A1 * | 9/2005 | Cheng ...................... 386/46 |
| 2005/0232136 | A1 | 10/2005 | Kwak |
| 2006/0020891 | A1 * | 1/2006 | Obara et al. ............... 715/718 |
| 2006/0023121 | A1 * | 2/2006 | Obara et al. ............... 348/554 |

FOREIGN PATENT DOCUMENTS

EP 1592155 A1 11/2005

(Continued)

Primary Examiner—Victor Kostak
(74) Attorney, Agent, or Firm—Kirton & McConkie; Evan R. Witt

(57) ABSTRACT

A power control method used with a TV module of a portable electronic apparatus is used for selectively entering the TV module in a power-saving mode. At first, the portable electronic apparatus is activated. When the portable electronic apparatus is activated, the power supply condition of the portable electronic apparatus is detected. If the power supply condition of the portable electronic apparatus indicates that an external power source is used, the power-saving mode of the TV module is suspended. Optionally, the power-saving mode of the TV module is suspended if a priority setting condition indicates that play efficiency takes priority.

16 Claims, 4 Drawing Sheets

FOREIGN PATENT DOCUMENTS

| | | |
|---|---|---|
| EP | 1746734 A2 | 1/2007 |
| JP | 6110590 A | 4/1994 |
| JP | 11-175205 A | 7/1999 |
| JP | 2004336330 | 11/2004 |
| JP | 2005142796 | 6/2005 |
| JP | 2005235384 A | 9/2005 |
| WO | 2005006722 A2 | 1/2005 |

* cited by examiner

POWER CONTROL METHOD USED WITH TV MODULE OF PORTABLE ELECTRONIC APPARATUS

FIELD OF THE INVENTION

The present invention relates to a power control method, and more particularly to a power control method used with a TV module of a portable electronic apparatus, wherein the TV module is allowable to enter a power-saving mode.

BACKGROUND OF THE INVENTION

With increasing development of mobile computing technology industries, a variety of portable electronic apparatuses such as personal digital assistants (PDAs), notebook computers or mobile phones are constantly improved. The development and improvement make these electronic products essential because they are feasible to be used in many instances. On account of their portability, the portable electronic apparatuses fabricated according to the mobile computing technologies are usable wherever and whenever the users are. In case no external power supply is provided, a built-in power supply such as a battery is usually employed as the main power source. Since the power supplied from the battery is limited, the power-saving means used in the portable electronic apparatus is taken into consideration.

Take the power-saving means used in the general personal computers or notebook computers for example. Many kinds and levels of power-saving modes are selectively used to achieve the purpose. One of the examples is so-called as ACPI (Advanced Configuration and Power Management Interface). ACPI is a specification defining standard interfaces for hardware configuration and power management of the power-saving means. According to the ACPI specification, the central processing unit (CPU) of the computer enters in various power-saving modes or a sleeping state when the user lets the operation system lie idle, thereby adjusting power consuming amount of the CPU, the hard disc, the display or the memory. Such power-saving means is widely used, especially in notebook computers for providing an effective power-saving and power management mechanism. As known, in some operation systems such as Windows, the power-saving means can be set manually according to the user's requirement and the power supply conditions.

Nowadays, somebody may have experience of watching cable TV programs through a personal computer. The TV signals can be transmitted to the personal computer by externally connecting a TV box to the computer or inserting a TV card conforming to the specification of a peripheral component interconnect (PCI) interface into a slot of the computer. Accordingly, the TV signals can be displayed on the display. Under this circumstance, the personal computer has advantageously functions as a TV set. Likewise, the cable TV programs can be shown on the display of the notebook computer by the similar technology. Please refer to FIG. 1(a), which is a schematic block diagram illustrating the configuration of playing cable TV programs on a notebook computer 10. As shown in FIG. 1(a), a cardbus adapter 11 is inserted into the notebook computer 10 and electrically connected to a signal input terminal of the cable TV 12. In such way, the TV programs can be displayed on the display of the notebook computer 10. Alternatively, a built-in TV card in communication with the signal input terminal of cable TV 12 can be provided in the notebook computer 10 to achieve the same purpose.

As known, the power-saving technology of the TV module, e.g. the TV card or the cardbus adapter, are independent of the power management system of the CPU of the notebook computer. For most notebook computers, the power-saving means is operated in an automatic mode and fails to be adjusted according to the user's demands. In consequence, the performance of the notebook computer is not optimized when the notebook computer is employed to play TV programs. Typically, the TV card or the cardbus adapter has several integrated circuits (ICs), including a TV tuner, a video decoder, a TV demodulator and the like. In a case that no power-saving means is taken, after the TV module containing these integrated circuits is built in or inserted into the notebook computer to be in communication with the notebook computer, the TV tuner or the video decoder will still be maintained in a stand-by state. Even if the TV module has not been used for playing the TV programs, the TV tuner or the video decoder in the stand-by state will continuously decode and transmit the TV signals. Under this circumstance, the power required for decoding and transmitting the TV signals is supplied from the notebook computer such that the battery consumes more energy. Whereas, in a case that the power-saving means is operated in the automatic mode, the related ICs of the TV module are shut off to enter the TV module in the power-saving mode when the TV module has not been used for playing the TV programs.

Referring to FIG. 1(b), a flowchart of a power control method used with the TV module of the notebook computer 10 is illustrated. First of all, after the notebook computer is activated, the TV module will automatically detect whether the TV module is operating. If the TV module is playing the TV programs, the power-saving mode of the TV module is suspended to make the TV module operate in a normal mode. Otherwise, the TV module enters the power-saving mode when the TV module is not playing the TV programs so as to disable the related ICs of the TV module and save power consumption of batteries contained in the notebook computer 10. The above procedures are automatically implemented according to the settings of the TV module but fail to be changed or set by the user. Under this circumstance, if the system has idled for a time period or the user intends to watch the TV programs, the related ICs of the TV module should be successively activated again. Since it takes a long time for the notebook computer 10 to successively activate or wake up the related ICs of the TV module, this power-saving operation is not user-friendly. Moreover, to determine if the TV module should enter the power-saving mode just depending upon whether the TV module is playing the TV programs. This power-saving operation is unsatisfied and inefficient.

In views of the above-described disadvantages resulted from the prior art, the applicant keeps on carving unflaggingly to develop a power control method through wholehearted experience and research.

SUMMARY OF THE INVENTION

The present invention provides a power control method used with a TV module of a portable electronic apparatus for selectively entering the TV module in a power-saving mode.

The present invention also provides a power control method for optimizing play efficiency of the TV module and effectively minimizing power consumption of the notebook computer, in which the power-saving mode is adjustable according to the user's requirement.

In accordance with an aspect of the present invention, the power control method comprises steps of activating the portable electronic apparatus; detecting an power supply condition of the portable electronic apparatus after the portable electronic apparatus is activated; and suspending the power-saving mode of the TV module if the power supply condition of the portable electronic apparatus indicates that an external power source is used.

In an embodiment, the power control method further comprises steps of detecting an operating condition of the TV module by the portable electronic apparatus; and suspending the power-saving mode of the TV module if the operating condition of the TV module indicates that the TV module is operating.

In an embodiment, the power control method further comprises a step of executing the power-saving mode of the TV module if the operating condition of the TV module indicates that the TV module is shut off and the power supply condition of the portable electronic apparatus indicates that a built-in power source is used.

In an embodiment, the TV module is a TV card built in the portable electronic apparatus or a cardbus adapter inserted into the portable electronic apparatus.

In an embodiment, the TV module is communicated with a TV signal terminal to process TV signals transmitted from the TV signal terminal so as to display the TV signals on the portable electronic apparatus.

In an embodiment, the TV module stops processing the TV signals when the TV module enters the power-saving mode, and the TV module continuously processes the TV signals and stays at a stand-by state when the power-saving mode is suspended.

In an embodiment, the operating condition of the TV module indicates that the TV module is operating if the processed TV signals are displayed on the portable electronic apparatus, and the operating condition of the TV module indicates that the TV module is shut off if no processed TV signals are displayed on the portable electronic apparatus.

In an embodiment, the power supply condition of the portable electronic apparatus indicates whether the main power source is an external power source or a built-in power source, wherein the external power source is a power supply for providing stable electricity, and the built-in power source is a battery for providing a certain level of charged electricity.

In an embodiment, the portable electronic apparatus is a personal digital assistant, a notebook computer or a mobile phone.

In accordance with another aspect of the present invention, the power control method comprises steps of activating the portable electronic apparatus; detecting a priority setting condition after the portable electronic apparatus is activated; and suspending the power-saving mode of the TV module if the priority setting condition indicates that play efficiency takes priority.

In an embodiment, the power control method further comprises steps of detecting the operating condition of the TV module by the portable electronic apparatus; and suspending the power-saving mode of the TV module if the operating condition of the TV module indicates that the TV module is operating.

In an embodiment, the power control method further comprises a step of executing the power-saving mode of the TV module if the operating condition of the TV module indicates that the TV module is shut off and the priority setting condition indicates that power-saving efficiency takes priority.

In an embodiment, the priority setting condition is set by executing an application program in the operation system run in the portable electronic apparatus. The TV module continuously processes the TV signals and stays at a stand-by state when the play efficiency takes priority, and the TV module stops processing the TV signals to enter the power-saving mode when the power-saving efficiency takes priority.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
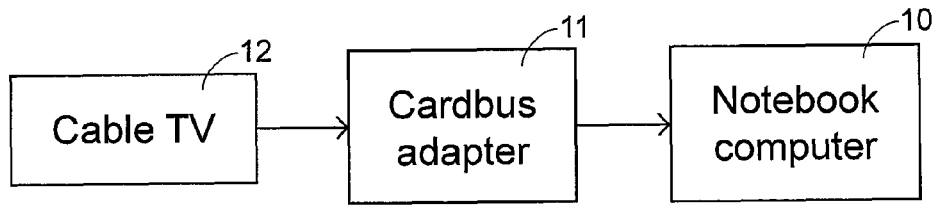
FIG. 1(a) is a schematic block diagram illustrating the configuration of playing cable TV programs on a notebook computer.
Figure 1B:
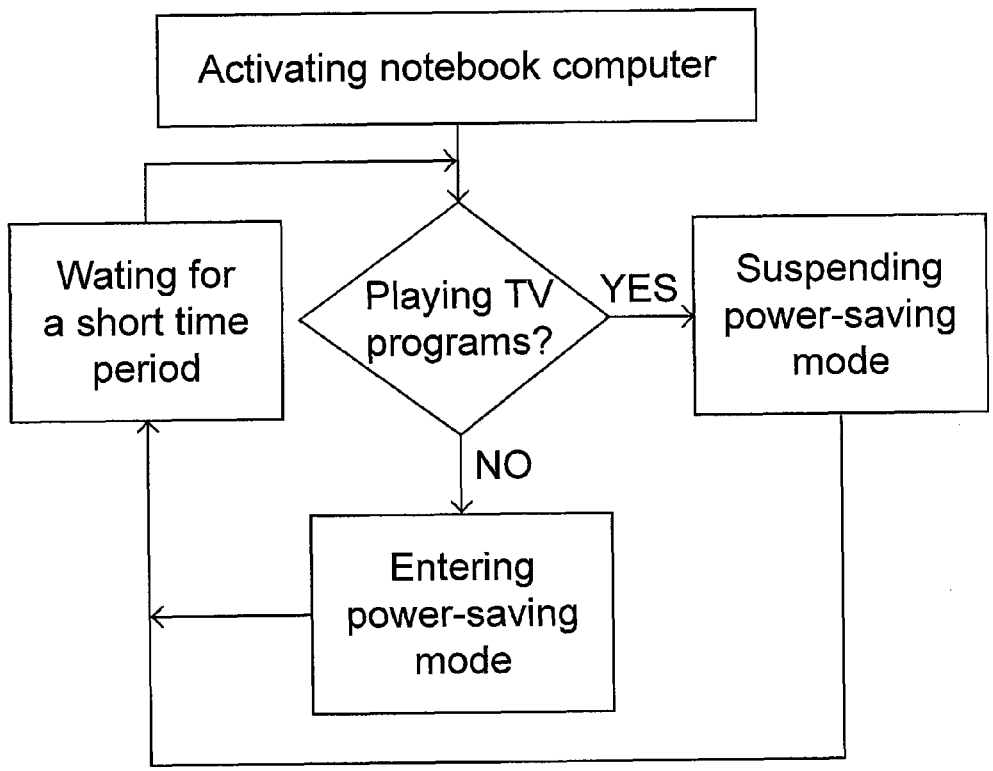
FIG. 1(b) is a flowchart illustrating a conventional power control method used with the TV module of the notebook computer.
Figure 2:
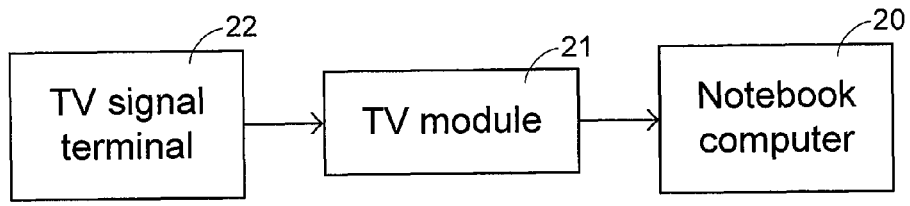
FIG. 2 is a schematic block diagram illustrating the configuration of playing cable TV programs on a notebook computer according to the present invention.

Please refer to FIG. 2, a schematic block diagram illustrating the configuration of playing cable TV programs on a portable electronic apparatus according to the present invention. In this embodiment, the portable electronic apparatus of the present invention can be implemented by a notebook computer 20. As shown in FIG. 2, the notebook computer 20 is communicated with a TV module 21. The TV module 21, as described in the prior art, can be a TV card built in the notebook computer 20 or a cardbus adapter inserted into a slot of the notebook computer 20. Once the TV module 21 is communicated with a TV signal terminal 22 in either a wireless transmission manner or a wired transmission manner, the TV module 21 will continuously decode and transmit the TV signals to the notebook computer 20 for display.

Likewise, the TV module 21 can be operated in a power-saving mode. In the power-saving mode, the related ICs or elements of the TV module 21 are disabled to stop processing TV signals. Under this circumstance, the power consumption of the system is reduced. If the power-saving mode is suspended, the TV module 21 will continuously process TV signals to allow the TV signals ready for display. At this moment, the system consumes more power.

As previously described, in accordance to the conventional technology, the power-saving mode is not adjustable by the user, and it is difficult for the TV module to perform efficiently in a power-saving manner. Take a computer system has both built-in power source and external power source for example. The built-in power source is typically a battery having a certain level of charged electricity, which is just able to run for a specified time period. The external power source is usually a power supply capable of providing stable electricity for a long term, and the power-saving efficiency is not as essential as limited power is available. Therefore, the optimal operation cannot be achieved since entering the TV module in the power-saving mode depends on whether the TV module is playing TV programs. If the computer system has both a built-in power source and an external power source, it is unnecessary to enter the TV module in the power-saving mode. Therefore, the power supply condition of the notebook computer 20 is detected by the TV module 21 to determine whether the TV module should be operated in the power-saving mode according to the detecting result.

Figure 3:
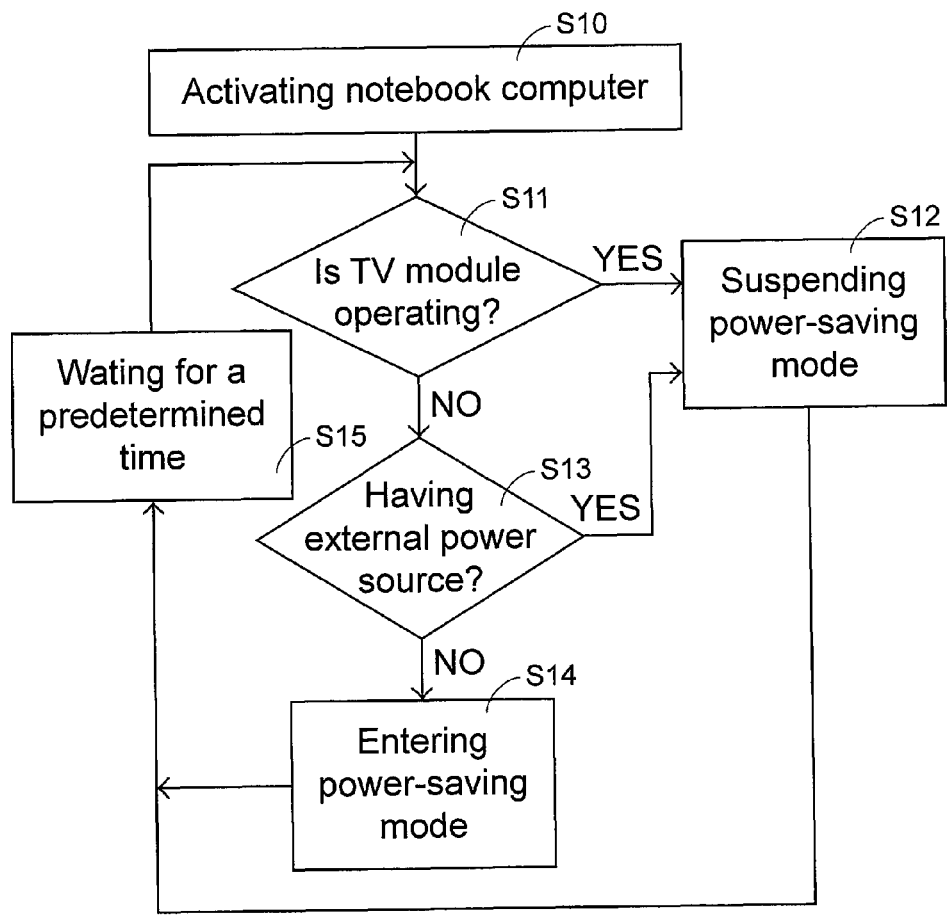
FIG. 3 is a flowchart illustrating a power control method according to a first preferred embodiment of the present invention.

Referring to FIG. 3, a flowchart of a power control method according to a first preferred embodiment of the present invention is illustrated. The power control method of this embodiment is operated in an automatic mode. First of all, the notebook computer 20 is activated (Step S10). Then, the notebook computer 20 detects the operating condition of the TV module 21 (Step S11). The term "operating condition" used herein indicates whether the playing function of the TV module 21 is enabled to process TV signals and display TV programs on the notebook computer 20. For example, in a case that there are TV programs displayed on the notebook computer 20, the operating condition is "ON". Whereas, in another case that no TV programs are displayed on the notebook computer 20, the operating condition is "OFF". If the detecting result indicates that the operating condition is "ON", the power-saving mode of the TV module 21 is suspended (Step S12). In other words, when the TV module 21 has been used for playing the TV programs, the related ICs or elements of the TV module 21 are enabled and it is improper to enter the TV module 21 in order to save power.

If the detecting result indicates that the operating condition is "OFF", the power supply condition of the notebook computer 20 needs to be detected (Step S13). The term "power supply condition" used herein indicates whether the main power source is the external power source or the built-in power source. For example, a power management program used in the Windows operation system can be used to detect the power supply condition of the notebook computer 20. When the notebook computer 20 has both built-in power source and external power source, the external power source is still viewed as the main power source. If the detecting result indicates that the main power source is an external power source, the power-saving source of the TV module 21 is suspended (Step S12). Otherwise, if only the built-in power source is used, the TV module 21 will enter the power-saving mode (Step S14).

In the above embodiment, in addition to the operating condition of the TV module 21, the power supply condition of the notebook computer 20 is also used to determine whether the TV module 21 should enter the power-saving mode. If the external power source is used and it is impossible to lack electricity, the power-saving mode of the TV module 21 is suspended and the related ICs or elements of the TV module 21 continuously decode and transmit the TV signals to allow the TV signals ready for display. Accordingly, a short time is required to activate the play function of the TV module 21. On the other hand, if the built-in power source is used, the TV module 21 will enter the power-saving mode to save power consumption when the operating condition of the TV module 21 is "OFF".

In the automatic mode of the power control method of the present invention, after the step S12 or S14 have been executed for a predetermined waiting time (Step S15), the operating condition of the TV module 21 and the power supply condition of the notebook computer 20 are detected again to further check and verify the performance of the power-saving means.

From the above description, the present invention improves the improper judgment on the execution of the power-saving mode under the condition that the notebook computer 20 has an external power source. Further, the power control method of the present invention gives consideration to both play efficiency and power-saving requirement.

Figure 4:
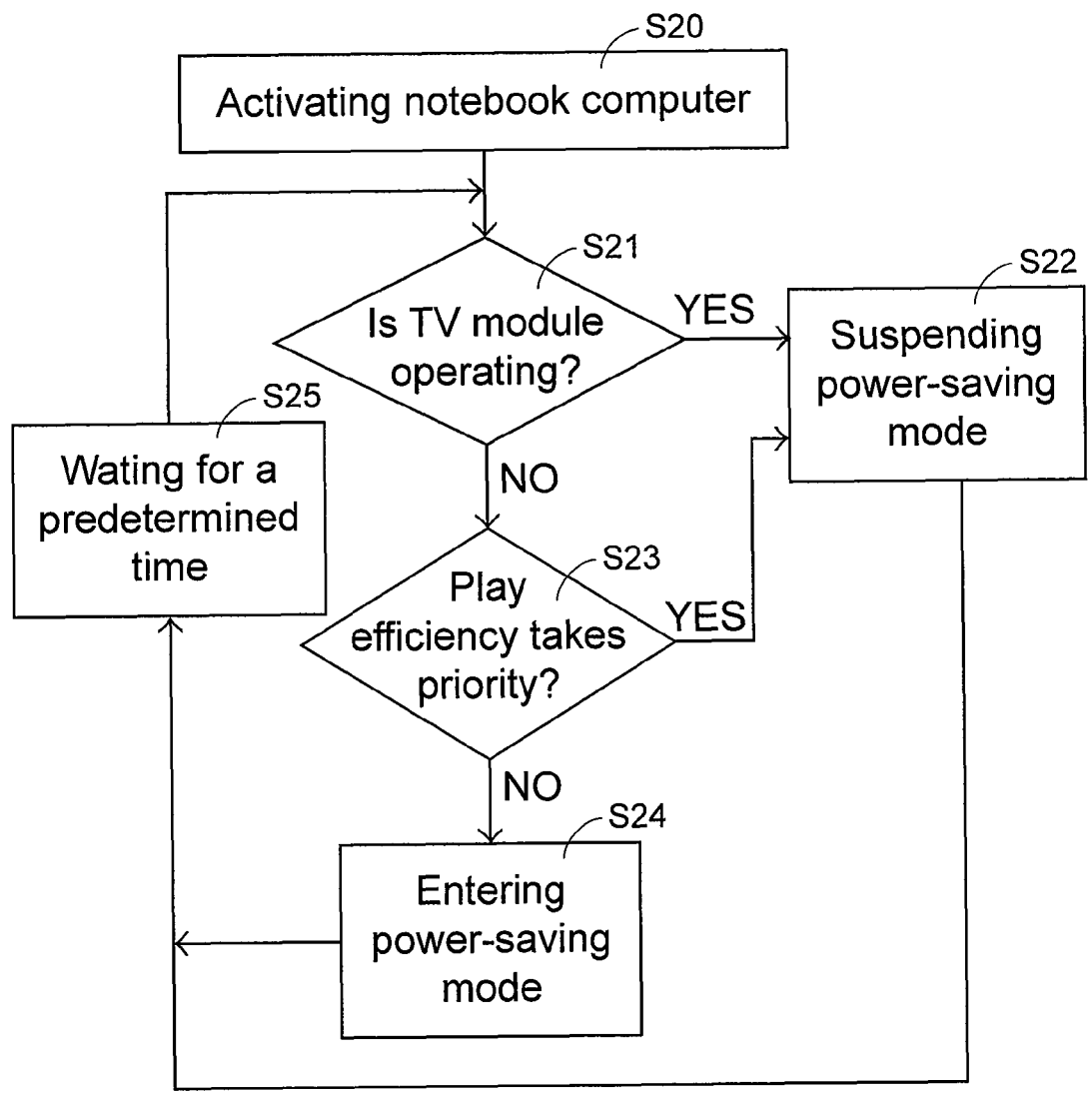
FIG. 4 is a flowchart illustrating a power control method according to a second preferred embodiment of the present invention.

Referring to FIG. 4, a flowchart of a power control method according to a second preferred embodiment of the present invention is illustrated. The power control method of this embodiment is operated in a manual mode. In accordance with another aspect of the present invention, the power control method can be adjusted by the user to have the TV module achieve better play efficiency. First of all, the notebook computer 20 is activated (Step S20). Then, the notebook computer 20 detects the operating condition of the TV module 21 (Step S21). The term "operating condition" used herein is the same as that described in the first preferred embodiment. If the detecting result indicates that the operating condition is "ON", the power-saving mode of the TV module 21 is suspended (Step S22).

If the detecting result indicates that the operating condition is "OFF", the priority setting condition is detected (Step S23). The term "priority setting condition" used herein indicates which of play efficiency and power-saving efficiency takes priority. The priority setting condition is set by executing an application program in the operation system run in the notebook computer 20. The application program can be a part of the driver for the TV module 21. If the play efficiency takes priority, the TV module 21 needs to be maintained in the stand-by state with continuous power consumption. Under this circumstance, the power-saving mode of the TV module 21 will be suspended (Step S22). Whereas, if the power-saving efficiency takes priority, it is unnecessary for the TV module 21 to be maintained in the stand-by state to meet power-saving requirement. Under this circumstance, the TV module 21 will enter the power-saving mode (Step S24).

In this embodiment, in addition to the operating condition of the TV module 21, the priority settings are also used to determinate whether the TV module 21 should enter the power-saving mode. In a case that the optimized play efficiency is required, the power-saving mode is suspended regardless of power consumption. Therefore, the TV module 21 may continuously process the TV signals and is maintained in the stand-by state. In another case that the optimized power utilization is required, the power-saving mode is executed to sacrifice the optimized play efficiency. Meanwhile, the TV module 21 will neither continuously process the TV signals nor be maintained in the stand-by state. From the above description, the power control method is flexible because the power-saving mode is selectively executed according to the user's demand.

In the manual mode of the power control method of the present invention, after the step S22 or S24 have been executed for a predetermined waiting time (Step S25), the operating condition of the TV module 21 and the priority setting condition are detected again to further check and verify the performance of the power-saving means. From the above description, the present invention improves the improper judgment on the execution of the power-saving mode. Further, the power control method of the present invention gives consideration to the user's prior demand so that the user can decide whether the TV module 21 should enter the power-saving mode by his self.

Figure 5:
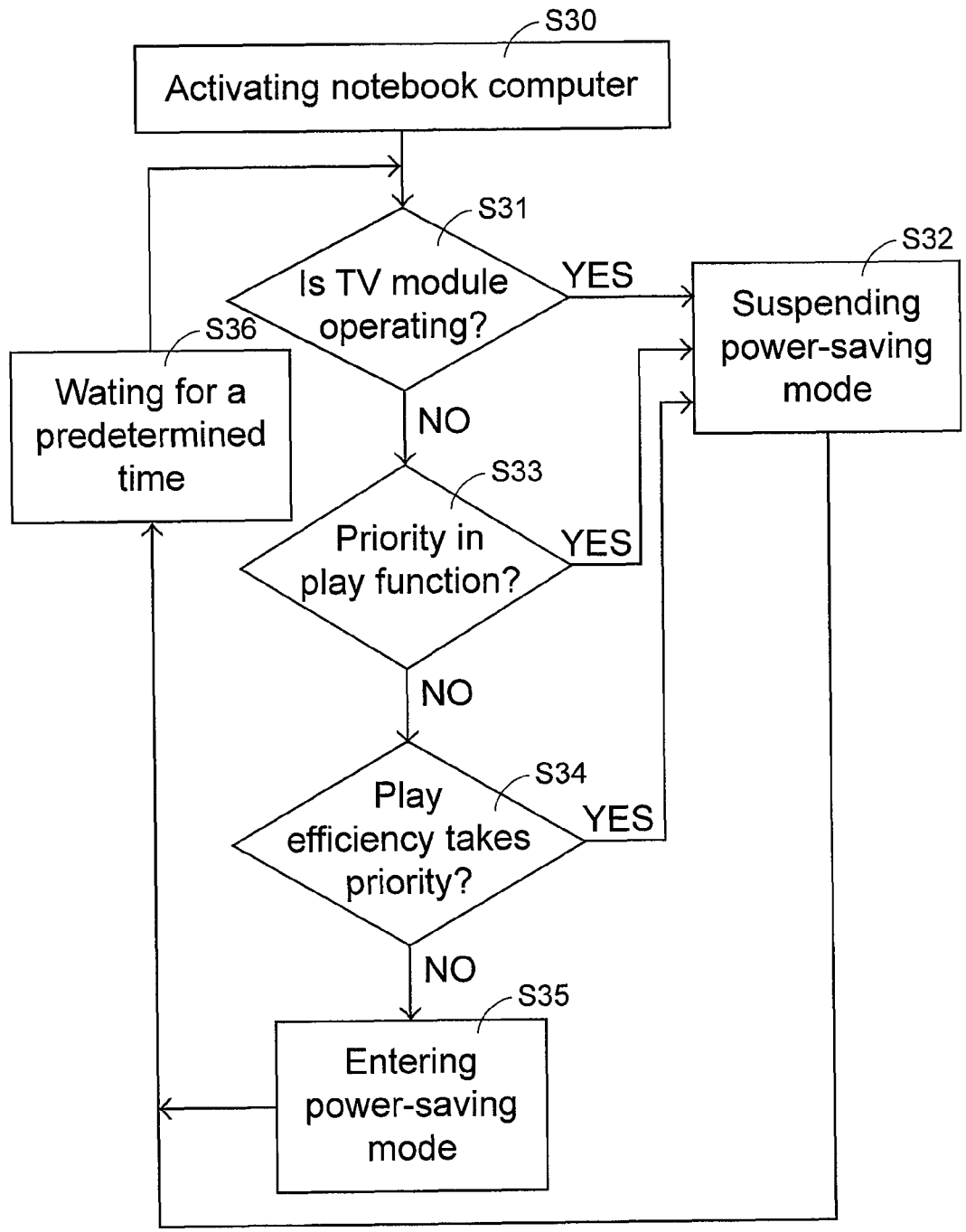
FIG. 5 is a flowchart illustrating a power control method according to a third preferred embodiment of the present invention.

Referring to FIG. 5, a flowchart of a power control method according to a third preferred embodiment of the present invention is illustrated. The power control method of this embodiment is operated in a semiautomatic mode. The features contained in the first and second preferred embodiments are incorporated herein. First of all, the notebook computer 20 is activated (Step S30). Then, the notebook computer 20 detects the operating condition of the TV module 21 (Step S31). If the detecting result indicates that the operating condition is "ON", the power-saving mode of the TV module 21 is suspended (Step S32). If the detecting result indicates that the operating condition is "OFF", the priority setting condition set by an application program in the operation system run in the notebook computer 20 will be detected (Step S33). If the play efficiency takes priority, the power-saving mode of the TV module 21 is suspended (Step S32). If the power-saving efficiency takes priority, the power supply condition of the notebook computer 20 needs to be detected (Step S34). If the detecting result indicates that the external power source is used as the main power source, the power-saving mode of the TV module 21 is suspended (Step S32). Otherwise, if only the built-in power source is used, the TV module 21 will enter the power-saving mode (Step S35). In this semiautomatic mode of the power control method, after the step S32 or S35 have been executed for a predetermined waiting time, the operating condition of the TV module 21, the priority setting condition and the power supply condition of the notebook computer 20 are detected again to further check and verify the performance of the power-saving means.

From the above description, the power control method of the present invention has several advantages. For example, in addition to the operating condition of the TV module 21, the power supply condition of the notebook computer 20 is also used to determine whether the TV module 21 should enter the power-saving mode. Hence, play efficiency of the TV module and power consumption of the notebook computer are both taken into consideration. Moreover, the power control method is flexible because the power-saving mode is selectively executed according to the user's demand.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power control method used with a TV module of a portable electronic apparatus for selectively entering the TV module in a power-saving mode, the power control method comprising steps of:
    activating the portable electronic apparatus;
    detecting an operating condition of the TV module by the portable electronic apparatus;
    suspending the power-saving mode of the TV module if the operating condition of the TV module indicates that the TV module is operating;
    detecting a power supply condition of the portable electronic apparatus by the TV module if the operating condition of the TV module indicates that the TV module is shut off; and
    suspending the power-saving mode of the TV module if the power supply condition of the portable electronic apparatus indicates that an external power source is used; and
    executing the power-saving mode of the TV module if the power supply condition of the portable electronic apparatus indicates that a built-in power source is used.

2. The power control method according to claim 1 wherein the TV module is communicated with a TV signal terminal to process TV signals transmitted from said TV signal terminal so as to display the TV signals on the portable electronic apparatus.

3. The power control method according to claim 2 wherein the TV module stops processing the TV signals when the TV module enters the power-saving mode, and the TV module continuously processes the TV signals and stays at a stand-by state when the power-saving mode of the TV module is suspended.

4. The power control method according to claim 2 wherein the operating condition of the TV module indicates that the TV module is operating if the processed TV signals are displayed on the portable electronic apparatus, and the operating condition of the TV module indicates that the TV module is shut off if no processed TV signals are displayed on the portable electronic apparatus.

5. The power control method according to claim 1 wherein the power supply condition of the portable electronic apparatus indicates whether the main power source is an external power source or a built-in power source, wherein said external power source is a power supply for providing stable electricity, and said built-in power source is a battery for providing a certain level of charged electricity.

6. The power control method according to claim 1 wherein the TV module is one of a TV card built in the portable electronic apparatus or a cardbus adapter inserted into the portable electronic apparatus.

7. The power control method according to claim 1 wherein the portable electronic apparatus is one selected from a group consisting of a personal digital assistant, a notebook computer and a mobile phone.

8. A power control method used with a TV module of a portable electronic apparatus for selectively entering the TV module in a power-saving mode, the power control method comprising steps of:
    activating the portable electronic apparatus;
    detecting an operating condition of the TV module by the portable electronic apparatus;
    suspending the power-saving mode of the TV module if the operating condition of the TV module indicates that the TV module is operating;
    detecting a priority setting condition by the TV module if the operating condition of the TV module indicates that the TV module is shut off;
    suspending the power-saving mode of the TV module if the priority setting condition indicates that play efficiency takes priority; and
    executing the power-saving mode of the TV module if the priority setting condition indicates that power-saving efficiency takes priority,
    wherein, the TV module is communicated with a TV signal terminal to process TV signals transmitted from the TV signal terminal so as to display the TV signals on the portable electronic apparatus, the TV module stops processing the TV signals when the TV module enters the power-saving mode, and the TV module continuously processes the TV signals and stays at a stand-by state when the power-saving mode of the TV module is suspended.

9. The power control method according to claim 8 wherein the operating condition of the TV module indicates that the TV module is operating if the processed TV signals are displayed on the portable electronic apparatus, and the operating condition of the TV module indicates that the TV module is shut off if no processed TV signals are displayed on the portable electronic apparatus.

10. The power control method according to claim 8 wherein the TV module is a TV card built in the portable electronic apparatus or a cardbus adapter inserted into the portable electronic apparatus.

11. The power control method according to claim 8 wherein the portable electronic apparatus is one selected from a group consisting of a personal digital assistant, a notebook computer and a mobile phone.

12. A power control method used with a TV module of a portable electronic apparatus for selectively enter the TV module in a power-saving mode, the power control method comprising steps of:

activating the portable electronic apparatus;

detecting an operating condition of the TV module;

suspending the power-saving mode of the TV module if the operating condition of the TV module indicates that the TV module is operating;

detecting a priority setting condition if the operating condition of the TV module indicates that the TV module is shut off;

suspending the power-saving mode of the TV module if the priority setting condition indicates that play efficiency takes priority, wherein the priority setting condition is set by executing an application program in the operation system run in the portable electronic apparatus;

detecting a power supply condition of the portable electronic apparatus if the priority setting condition indicates that power-saving efficiency takes priority;

suspending the power-saving mode of the TV module if the power supply condition of the portable electronic apparatus indicates that an external power source is used; and the TV module entering the power-saving mode if the power supply condition of the portable electronic apparatus indicates that a built-in power source is used.

13. A power control method used with a TV module of a portable electronic apparatus for selectively entering the TV module in a power-saving mode, the power control method comprising steps of:

activating the portable electronic apparatus;

detecting an operating condition of the TV module by the portable electronic apparatus;

suspending the power-saving mode of the TV module if the operating condition of the TV module indicates that the TV module is operating;

detecting a priority setting condition by the TV module if the operating condition of the TV module indicates that the TV module is shut off;

suspending the power-saving mode of the TV module if the priority setting condition indicates that play efficiency takes priority; and executing the power-saving mode of the TV module if the priority setting condition indicates that power-saving efficiency takes priority, wherein, the TV module is communicated with a TV signal terminal to process TV signals transmitted from the TV signal terminal so as to display the TV signals on the portable electronic apparatus, the priority setting condition is set by executing an application program in the operation system run in the portable electronic apparatus, the TV module continuously processes the TV signals and stays at a stand-by state when play efficiency takes priority, and the TV module stops processing the TV signals to enter the power-saving mode when the power-saving efficiency takes priority.

14. The power control method according to claim 13, wherein the operating condition of the TV module indicates that the TV module is operating if the processed TV signals are displayed on the portable electronic apparatus, and the operating condition of the TV module indicates that the TV module is shut off if no processed TV signals are displayed on the portable electronic apparatus.

15. The power control method according to claim 13 wherein the TV module is a TV card built in the portable electronic apparatus or a cardbus adapter inserted into the portable electronic apparatus.

16. The power control method according to claim 13 wherein the portable electronic apparatus is one selected from a group consisting of a personal digital assistant, a notebook computer and a mobile phone.

\* \* \* \* \*